United States Patent
Xu

(10) Patent No.: US 6,551,732 B1
(45) Date of Patent: Apr. 22, 2003

(54) USE OF FUEL CELL CATHODE EFFLUENT IN A FUEL REFORMER TO PRODUCE HYDROGEN FOR THE FUEL CELL ANODE

(75) Inventor: Jianguo Xu, Wrightsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 223 days.

(21) Appl. No.: 09/663,553

(22) Filed: Sep. 18, 2000

(51) Int. Cl.[7] .................................................. H01M 8/06
(52) U.S. Cl. ............................. 429/17; 429/20; 429/26
(58) Field of Search ............................. 429/20, 17, 26

(56) References Cited

U.S. PATENT DOCUMENTS

| | | | |
|---|---|---|---|
| 4,828,940 A | 5/1989 | Cohen et al. | 429/20 |
| 4,994,331 A | 2/1991 | Cohen | 429/17 |
| 5,360,679 A | 11/1994 | Buswell et al. | 429/19 |
| 5,928,807 A | 7/1999 | Elias | 429/35 |
| 5,976,724 A | 11/1999 | Bloomfield | 429/21 |
| 6,331,366 B1 * | 12/2001 | Van Dine et al. | 429/17 |
| 6,365,289 B1 * | 4/2002 | Lee et al. | 429/13 |

* cited by examiner

Primary Examiner—John S. Maples
(74) Attorney, Agent, or Firm—Geoffrey L. Chase

(57) ABSTRACT

A fuel cell power system is provided that includes a fuel cell for generating electricity that has a cathode, an anode, and a polymer electrolyte membrane. The fuel cell processes air through the cathode to yield a cathode effluent stream. The fuel cell power system further includes a fuel processor for converting an inlet fuel stream of hydrogen and carbon containing fuels, utilizing a stream of oxygen containing gas and water vapor, to a processed fuel stream of hydrogen molecules for feeding into the fuel cell anode. The system then feeds a substantial portion of the cathode effluent stream to the fuel processor as the oxygen containing gas and water vapor for converting the fuel stream into hydrogen. A method of using the system is also provided.

25 Claims, 1 Drawing Sheet

USE OF FUEL CELL CATHODE EFFLUENT IN A FUEL REFORMER TO PRODUCE HYDROGEN FOR THE FUEL CELL ANODE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention is directed to fuel cells and, in particular, to an increase in the efficiency of proton exchange membrane (PEM) fuel cells.

A fuel cell is an electrochemical cell that converts the chemical energy of a fuel directly into electric energy in a continuous process. The overall fuel cell reaction typically involves the combination of hydrogen with oxygen to form water. For example, at 25 degrees Celsius and at 1 atmosphere pressure, the reaction $$H_2 + 1/2(O_2) = H_2O$$

takes place with a free energy change ($\Delta G$) of $-56,69$ kcal/mole. In a galvanic cell, this reaction produces a theoretical cell voltage of 1.23 volts.

The main types of fuel cells used today include proton exchange membrane (PEM) fuel cells, phosphoric acid fuel cells, alkaline fuel cells, solid oxide fuel cells, and molten carbonate fuel cells.

Fuel cells are limited by their need for pure hydrogen fuel. Most types of fuel cells are sensitive to even small amounts of impurities. A "reformer" is a known device in which a hydrocarbon fuel is mixed with steam, in the presence of a catalyst, to convert the fuel/steam mixture to hydrogen, carbon monoxide, carbon dioxide, water and impurities. Since most known reformers are sensitive to the presence of impurities, impurities such as sulphur are generally removed from the fuel before entering the reformer. Additional mechanisms are required to almost completely eliminate carbon monoxide (CO) and other potentially harmful impurities from the reformer product gas.

In simple form, a fuel cell consists of two electrodes, an anode and a cathode, separated from one another by an electrolyte or ion-conducting membrane. Oxygen is fed over the cathode and hydrogen is fed over the anode, generating electricity as well as heat and water. Fuel cells which use a reformer can use the hydrogen from any hydrocarbon fuel, including natural gas, methanol, or gasoline.

Fuel cells are environmentally friendly due to the near absence of emission of nitrogen oxides, sulfur oxides, hydrocarbons, carbon monoxide etc. Fuel cells have the potential of being thermodynamically more efficient, and therefore have the potential to reduce green house gas (carbon dioxide) emission. Fuel cells with proton exchange membrane (PEM) electrolyte have the benefit of being compact and being able to work at close to ambient temperature (and therefore suitable for quick start). Fuel cells with PEM electrolyte are considered a good potential source of power for future automobiles as well as for disaggregated electricity and heat production with virtually unlimited potential in developing countries undergoing electrification.

The PEM fuel cell technology has advanced to such a degree that a suitcase-sized fuel cell can provide enough power for a car. For example, Daimler-Benz unveiled its fuel cell vehicle, NECAR 3, in September, 1997. This car uses a Ballard PEM fuel cell engine and methanol fuel with a fuel processor and has a 400 kilometer range. The major automobile companies in the world are allocating a lot of resources on PEM fuel cell automobiles development with the hope that commercial production can begin in several years. DaimlerChrysler released NECAR 4 in 1999 and will bring out NECAR 5 in 2000.

Utility companies and machinery manufacturers are also investing in this area in an attempt to commercialize this technology for small power generators. Recently, at least one manufacturer announced that it had increased the power density of a PEM fuel cell to 1.31 kW/liter. The recent progress in PEM fuel cell caused a lot of attention in the media and the investment community.

As indicated above, PEM fuel cells run on hydrogen or hydrogen containing gases. Such gases have to be obtained by processing a conventional fuel through, for example, a steam reforming unit, a partial oxidation unit, or an autothermal reforming unit, as are well known. Recently, A. D. Little developed a selective oxidation process that reduces the CO content to below 10–30 ppm so that the hydrogen containing gas produced from such fuel processors can be used in PEM fuel cells without poisoning the fuel cell. Toyota Motor Corporation is now developing a new small methanol reformer which is approximately 600 millimeters long and 300 millimeters in diameter with a reforming section and a carbon monoxide oxidizing section, with a production rate of 600 liters of hydrogen per minute. Improvements have also been made in the more than 20 minutes startup time reported in 1997.

In a typical PEM fuel cell powered by a liquid fuel, the fuel is converted to hydrogen containing gas by a steam reformer, a partial oxidation reactor, or an autothermal reformer. The autothermal reforming process is more compact and efficient, and is likely to start up faster than the steam reformer. Therefore, the autothermal reformer has great potential for being used in fuel cell vehicles (as well as in other applications), especially those powered by hydrocarbons such as gasoline, propane, or natural gas.

In an autothermal reformer, the fuel, an oxygen containing gas, and water vapor are fed to react and form hydrogen, carbon monoxide, and carbon dioxide, with a small amount of one or more impurities, for example, methane. The partial oxidation reaction of the fuel is exothermic and supplies the heat for the endothermic steam reforming reaction. The reformate then is reduced in temperature and undergoes a water-gas shift reaction to react most carbon monoxide with water vapor into hydrogen and carbon dioxide. Then, the gas is further cooled to close to 90 degrees Celsius and goes through a selective oxidation process in which an oxygen containing gas is fed to selectively oxidize the carbon monoxide so that its concentration is less than 10–30 ppm when exiting from the selective oxidation unit. This nearly carbon monoxide free gas is then sent to the anode of the fuel cell.

On the cathode side of the fuel cell, air or another oxygen containing gas is fed through the cathode. At least a portion of the water formed in the fuel cell reaction is brought out by the cathode gas in the form of water vapor. In order to reduce the size, a fuel cell typically works at 2–3 bar, for example, by compressing the air or oxygen containing gas before it is used in the cathode and the fuel processor.

Due to the existence of inert gases in the anode gas, some of the anode gas has to be purged and burned with the some of the vent gas, i.e. effluent gas, from the cathode. The resultant hot gas can be used to supply the heat for steam reforming, or raise steam and/or heating of the feed streams to the fuel process. For example, U.S. Pat. Nos. 4,828,940 and 4,994,331 mention the use of cathode effluent and anode effluent as the oxidant and fuel for the burner that supplies heat for steam reforming as well as for preheating of the cathode effluent. The resultant hot gas can also be used to drive a gas turbine expander which may be mechanically connected with the air compressor. If only a portion of the cathode effluent is used for combustion of the anode purge gas, the remaining portion of the cathode effluent can be used to drive a gas turbine expander. Additional cooling of the fuel cell may be necessary and can be carried out by a cooling water system. The heat of the reformer effluent can be used to raise water vapor.

U.S. Pat. No. 5,360,679 teaches a hydrocarbon fueled fuel cell electric power generation system that producers electrical power from gaseous or liquid hydrocarbon fuels using a fuel cell stack employing ion exchange membranes. A reformer is used to produce a hydrogen-rich gas. The effluent from the fuel cell cathode is not used in the reformer to produce hydrogen for the fuel cell anode.

U.S. Pat. No. 5,976,724 generally teaches a fuel cell power plant that includes an autothermal reformer. An anode gas loop circulates between the anode section of the fuel cell and an anode supply region of the reformer. A gas mixture of hydrogen and a carrier gas leaves the anode section with a low hydrogen partial pressure, since hydrogen is consumed within the anode section of the fuel cell. Hydrogen is transferred into the anode gas loop through a membrane layer in the reformer. A heat exchanger transfers heat from a cold side of the anode gas loop to a hot side of the anode gas loop. Another heat exchanger transfers heat from the cold side of the anode gas loop to act as a heat source outside the system. Again, a portion of the cathode effluent stream is not fed to the fuel processor as the oxygen containing gas and water vapor for converting the fuel stream into hydrogen.

U.S. Pat. No. 5,928,807 generally teaches polymer electrolyte membrane type fuel cells.

A major drawback of the processes and apparatus in the prior art is that the water vapor in the cathode effluent is not used in an effective way before it is released into atmosphere.

It is principally desired to provide a fuel cell power system that overcomes the. limitations of the prior art.

It is further desired to provide a fuel cell power system having increased efficiency.

Finally, it is desired to provide a fuel cell power system having increased efficiency due to more effective use of the cathode effluent.

BRIEF SUMMARY OF THE INVENTION

The objective of the present invention is to increase the fuel efficiency of fuel processor-proton exchange membrane fuel cell power systems. The present invention teaches use of the cathode effluent gas that contains residual oxygen and water vapor (as well as inert gas such as nitrogen and argon) as a feed to the fuel processor for partial oxidation or preferably for autothermal reforming to transform the fuel into hydrogen containing gas usable in the fuel cell reaction, so that part of the waste heat in the fuel cell can be recovered in the form of water vapor for use in fuel processing.

The sensible heat of the reformate can be used to preheat the feed to a higher temperature if the water vapor feed to the fuel processor is generated from a different source. That can reduce the amount of partial oxidation reaction needed to keep the temperature in the autothermal reformer, and more hydrogen can be produced from the steam reforming reaction, therefore increasing the thermodynamic efficiency of the entire system. The water vapor can be supplied by feeding the cathode effluent to the auto-thermal reformer (better after it is preheated by the reformer effluent). Since the fuel cell reaction produces more water than that is consumed in the fuel processor and the fuel cell typically works at 80–100 deg C., it is an ideal source of water vapor. This can also potentially reduce the total amount of air (or other oxygen containing gas) to be compressed for the same cathode oxygen partial pressure. The heat of water vaporization is significant. For example, it takes 16 moles of water vapor to convert one mole of octane to hydrogen and carbon dioxide. The heat of combustion of n-octane, a component of gasoline, is 1,223 kcal/mole, while that of vaporization heat of 16 moles of water is 152 kcal/mole (for methanol, it is 162 kcal of combustion heat versus 19 kcal of heat of vaporization). This means the heat of vaporization of the water vapor used in the reformer is approximately 12% of the combustion heat of the some of the typical fuels. Furthermore, typically, the amount of water vapor is significantly higher than that of the stoichiometric number to avoid carbon formation, and due to thermodynamic equilibrium. It is not common to see a steam/carbon ratio of significantly greater than that of stoichiometric for the reforming of hydrocarbons. Therefore, the amount of heat needed to generate the steam may be even greater. When less heat is needed, less oxidation is needed for keeping the reactor temperature. That increases the hydrogen yield. This will at least partially compensate for the increased inert fraction in the air or oxygen containing gas. The reduction in the need for compression as well as the reduced flow of the oxygen containing gas used for combustion can further reduce the power consumption of the compressor and potentially increase the efficiency of the expander. Overall, it is possible to save more than 10% fuel over the conventional fuel cell cycles by using the present invention. It is also possible to use the cathode effluent in the selective oxidation reactor for carbon monoxide scavenging.

The present invention is for a fuel cell power system that includes a fuel cell for generating electricity that has a cathode, an anode, and a polymer electrolyte membrane. The fuel cell processes air through the cathode to yield a cathode effluent stream. The fuel cell power system further includes a fuel processor for converting an inlet fuel stream of hydrogen and carbon containing fuels, utilizing a stream of oxygen containing gas and water vapor, to a processed fuel stream of hydrogen molecules for feeding into the fuel cell anode. The system then feeds a substantial portion of the cathode effluent stream to the fuel processor as the oxygen containing gas and water vapor for converting the fuel stream into hydrogen.

The inlet fuel stream may include one or more of methanol, ethanol, natural gas, propane, gasoline, kerosene, and diesel oil. The fuel processor may be a partial oxidation reactor or may be an autothermal reformer. The fuel processor may include a water-gas shift reactor downstream of the autothermal reformer. The fuel processor may include a preferential carbon monoxide oxidation reactor for processing the processed fuel stream prior to feeding the processed fuel stream into the fuel cell anode. The system may include an air compressor upstream of the fuel cell cathode. The system may include a water vapor saturator downstream of the air compressor and upstream of the fuel cell cathode. The system may include at least one heat exchanger downstream of the fuel cell cathode and upstream of the fuel processor to heat the substantial portion of the cathode effluent stream. The system may include a combustor downstream of the fuel cell anode to burn any anode effluent. The system may include an expander downstream of the combustor to expand flue gas from the combustor. The expander may be mechanically linked with an air compressor upstream of the fuel cell cathode. The expanded flue gas may be used to indirectly heat the inlet fuel stream to the fuel processor. A portion of the cathode effluent stream may be directed to the preferential oxidation reactor. A portion of the cathode effluent may be directed to the combustor. The processed fuel stream exiting the autothermal reformer may be cooled by using the processed fuel stream as an indirect heat transfer medium in a heat exchanger that indirectly heats the inlet gas stream and the stream of oxygen containing gas and water vapor to the autothermal reformer. A method utilizing the above apparatus is also provided.

DETAILED DESCRIPTION OF THE INVENTION

Figure 1:
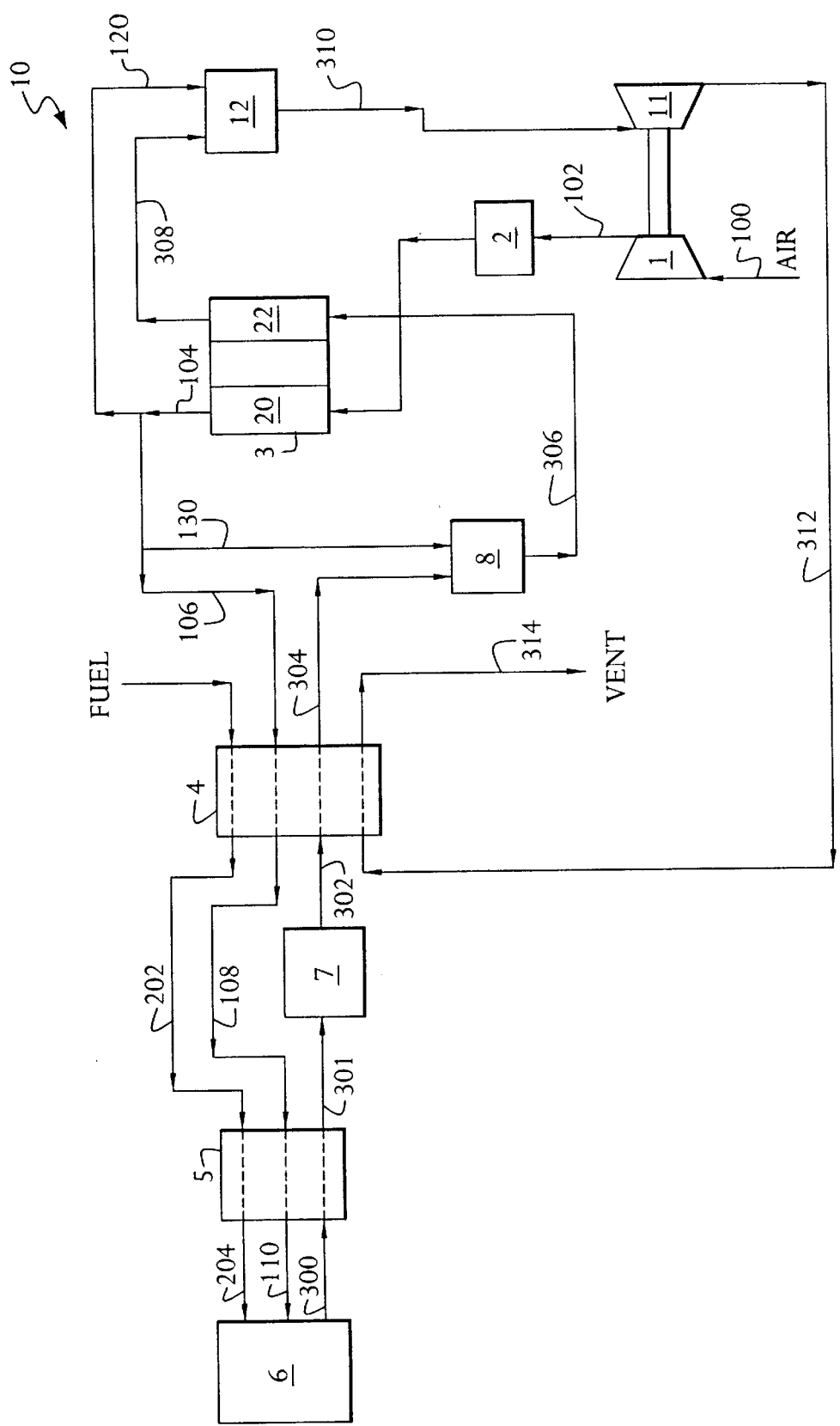
FIG. 1 is a schematic diagram of a fuel cell power system in accordance with one preferred embodiment of the present invention.

Referring now to the drawing, there is shown in FIG. 1 a fuel cell power system 10 in accordance with one preferred embodiment of the present invention. In this system 10, feed air 100 is compressed by compressor 1. The compressed air stream 102, which may optionally go through an additional processor 2, such as an oxygen concentrator, is fed to the cathode side 20 of a proton exchange membrane fuel cell 3. In the cathode side 20 of the fuel cell 3, some of the oxygen contained in the air is consumed by the fuel cell reaction, while some of the water formed by the fuel cell reaction enters the gas stream and substantially saturates the cathode gas with water vapor. Optionally, in processor 2, this saturation process may occur before the air is used in the cathode reaction. A significant portion, stream 106, of the cathode effluent 104, which is essentially nitrogen, water vapor, argon, and residual oxygen, is further heated in heat exchangers 4 and 5 (via stream 108) to a substantially higher temperature, preferentially higher than 400 degrees centigrade. This heated mixture of water vapor and residual air, stream 110, is fed to autothermal reformer 6, which may alternatively be a partial oxidation reactor. Meanwhile, fuel, which may be natural gas, propane, gasoline, or methanol, ethanol, or other. hydrogen and carbon containing compounds in gaseous or liquid form, is heated in heat exchangers 4 and 5 (via stream 202). The heated fuel, via stream 204 then enters the autothermal reformer 6 to react with the heated mixture of water vapor and residual air, stream 110, in the reformer 6, to form a reformate which exits the autothermal reformer 6 as stream 300. The reformate, stream 300, is composed of hydrogen, carbon monoxide, carbon dioxide and inert gas, and in certain cases, some residual methane. This hot reformate, stream 300, is cooled in heat exchanger 5. If the reformate contains a substantial amount of carbon monoxide, the reformate preferably enters, via stream 301, a water-gas shift reactor 7 to convert some of the carbon monoxide and water vapor into hydrogen and carbon dioxide. This reformate, via stream 302, is then further cooled in heat exchanger 4 to close to 90 degree centigrade and exits as steam 304. Stream 304 then enters a preferential oxidation reactor 8 to selectively oxidize the remaining carbon monoxide such that the effluent of this reactor, stream 306, has a carbon monoxide level tolerable for the fuel cell 3.

A portion of the cathode effluent, stream 130, provides the oxygen needed for the preferential oxidation reaction in reactor 8. Note that stream 130 can be replaced by a different source of oxygen, such as air directly coming from the discharge end of the air compressor 1. The nearly carbon monoxide free reformate from the preferential oxidation reactor, stream 306, is fed to the anode side 22 of the fuel cell 3.

In the anode side 22 of the fuel cell 3, most hydrogen is consumed by the fuel cell reaction. The substantially hydrogen depleted gas from the anode side 22, via stream 308, is burned with a portion of the cathode effluent, stream 120, in combustor 12. Note that other sources of oxidant, such as the air from the discharge end of the air compressor 1, can be used in the place of the cathode effluent. The hot flue gas from the combustor 12, stream 310, is expanded in the gas turbine expander 11. The expander exhaust, stream 312, which is still hot, can be used to heat the feed to the autothermal reformer 6 in heat exchanger 4, prior to its venting via stream 314. Alternatively, expander exhaust may go through both heat exchangers 5 and 4 (not shown), or only heat exchanger 5 (not shown). Note that both heat exchanger 4 and 5 can comprise several physical heat exchangers. On the other hand, it may also be possible that heat exchangers 4 and 5 are one and same physical heat exchanger. The expander 11 can be physically connected to the air compressor 1. It can also be connected to a generator (not shown) to generate electricity. When the power produced from the expander 11 is greater than that needed for the compressor 1, the expander 11 can be connected to both the air compressor 1 and the generator.

If the oxygen containing gas is oxygen gas or oxygen enriched air, to reduce the fuel cell size or increase the electrical potential, or both, the same process can be used. However, if the oxygen concentration is high in the cathode gas, the fuel cell 3 will have to work at a higher temperature to have the right oxygen/water vapor ratio, or some water vapor has to be added to achieve the right ratio. Such additional water vapor can be produced from the downstream of the autothermal reformer 6, and/or from the flue gas from the combustor 12 that combusts the anode effluent, either before or after it is expanded in the expander 11.

It is worth noting that air directly coming from the air compressor 1 or other sources can also be used as a source of oxygen for the autothermal reformer 6 or partial oxidation reactor, in addition to the cathode effluent. For example, if necessary, such air can be used to aid the combustion process by introducing such air to the burner (or burners) of the autothermal reformer 6, while some or all of the cathode effluent can be introduced into the autothermal reformer 6 without going through the burners of the reformer 6. The same is true for the anode effluent combustor 12. Air from the air compressor 1 or other sources can be used as at least a portion of the oxidant needed in the anode gas combustor 12.

While FIG. 1 Shows one water-gas shift reactor, there can be more than one such shift reactors. Typically, a high temperature shift reactor and a low temperature reactor are used: the effluent from the high temperature shift reactor is cooled and fed to the low temperature shift reactor is cooled and fed to the low temperature shift reactor to further convert carbon monoxide to carbon dioxide.

The autothermal reformer may be an electrochemical autothermal reformer. In such a reformer, there is a mixed conductor layer that separates the autothermal reformer region from the anode supply region. The fuel gas from the anode supply region will be a hydrogen containing stream which is essentially free from such contaminants as methane, carbon dioxide, and carbon monoxide. Such a fuel gas can be directly used in the fuel cell without going through the water-gas shift reactor and the preferential oxidation reactor. The residue from the autothermal reformer side, which contains some residual hydrogen, and methane, carbon dioxide and carbon monoxide, can be combusted with an air stream or a portion of the fuel cell cathode effluent that contains residual oxygen and water vapor. The flue gas from the combustor can be used to drive the gas turbine expander. A steam stream may be used to sweep the anode supply region to reduce the partial pressure on that side of the membrane to increase the driving force for hydrogen to transfer from the autothermal reformer region to the anode supply region.

Although illustrated and described herein with reference to specific embodiments, the present invention nevertheless is not intended to be limited to the details shown. Rather, various modifications may be made in the details within the scope and range of equivalents of the claims without departing from the spirit of the invention.

What is claimed is:

1. A fuel cell power system, comprising:
   (a) at least one fuel cell for generating electricity, said fuel cell comprising a cathode, an anode, and a polymer electrolyte membrane disposed therebetween, said at least one fuel cell including means to process air through the cathode to yield a cathode effluent stream;
   (b) a fuel processor for converting an inlet fuel stream consisting essentially of hydrogen and carbon containing fuels, utilizing a stream of oxygen containing gas and water vapor, to a processed fuel stream comprising hydrogen molecules for feeding into the fuel cell anode;
   (c) means to feed a substantial portion of the cathode effluent stream to the fuel processor as the oxygen containing gas and water vapor for reacting with and converting the fuel stream into the processed fuel stream comprising hydrogen molecules;
   (d) a combustor downstream of the fuel cell cathode to burn the cathode effluent;
   (e) means to direct a portion of the cathode effluent to the combustor; and
   (f) an expander downstream of the combustor to expand flue gas from the combustor.

2. The fuel cell power system of claim 1, wherein the inlet fuel stream consisting essentially of hydrogen and carbon containing fuels is selected from the group consisting of one or more of methanol, ethanol, natural gas, propane, gasoline, kerosene, and diesel oil.

3. The fuel cell power system of claim 1, wherein the fuel processor is a partial oxidation reactor.

4. The fuel cell power system of claim 1, wherein the fuel processor is an autothermal reformer.

5. The fuel cell power system of claim 1 wherein the fuel processor includes a water-gas shift reactor downstream of the autothermal reformer.

6. The fuel cell power system of claim 1, wherein the fuel processor includes a preferential carbon monoxide oxidation reactor.

7. The fuel cell power system of claim 1, including an air compressor upstream of the fuel cell cathode.

8. A fuel cell power system, comprising:
   (a) at least one fuel cell for generating electricity, said fuel cell comprising a cathode, an anode, and a polymer electrolyte membrane disposed therebetween, said at least one fuel cell including means to process air through the cathode to yield a cathode effluent stream;
   (b) a fuel processor for converting an inlet fuel stream consisting essentially of hydrogen and carbon containing fuels, utilizing a stream of oxygen containing gas and water vapor, to a processed fuel stream comprising hydrogen molecules for feeding into the fuel cell anode;
   (c) means to feed a substantial portion of the cathode effluent stream to the fuel processor as the oxygen containing gas and water vapor for reacting with and converting the fuel stream into the processed fuel stream comprising hydrogen molecules;
   (d) an air compressor upstream of the fuel cell cathode; and
   (e) a water vapor saturator downstream of the air compressor and upstream of the fuel cell cathode.

9. The fuel cell power system of claim 1, including at least one heat exchanger downstream of the fuel cell cathode and upstream of the fuel processor to heat the substantial portion of the cathode effluent stream.

10. A fuel cell power system, comprising:
    (a) at least one fuel cell for generating electricity, said fuel cell comprising a cathode, an anode, and a polymer electrolyte membrane disposed therebetween, said at least one fuel cell including means to process air through the cathode to yield a cathode effluent stream;
    (b) a fuel processor for converting an inlet fuel stream consisting essentially of hydrogen and carbon containing fuels, utilizing a stream of oxygen containing gas and water vapor, to a processed fuel stream comprising hydrogen molecules for feeding into the fuel cell anode;
    (c) means to feed a substantial portion of the cathode effluent stream to the fuel processor as the oxygen containing gas and water vapor for reacting with and converting the fuel stream into the processed fuel stream comprising hydrogen molecules;
    (d) a combustor downstream of the fuel cell anode to burn any anode effluent; and
    (e) an expander downstream of the combustor to expand flue gas from the combustor wherein the expanded flue gas is used to indirectly heat the inlet fuel stream to the fuel processor.

11. The fuel cell power system of claim 6, including means to direct a portion of the cathode effluent stream to the preferential oxidation reactor.

12. A fuel cell power system, comprising:
    (a) at least one fuel cell for generating electricity, said fuel cell comprising a cathode, an anode, and a polymer electrolyte membrane disposed therebetween, said at least one fuel cell including means to process air through the cathode to yield a cathode effluent stream;
    (b) an autothermal reformer for converting an inlet fuel stream consisting essentially of hydrogen and carbon containing fuels, utilizing a stream of oxygen containing gas and water vapor, to a processed fuel stream comprising hydrogen molecules for feeding into the fuel cell anode;
    (c) means to feed a substantial portion of the cathode effluent stream to the fuel processor as the oxygen containing gas and water vapor for reacting with and converting the fuel stream into the processed fuel stream comprising hydrogen molecules; and (d) wherein the processed fuel stream exiting the autothermal reformer is cooled by using an unprocessed fuel stream as an indirect heat transfer medium in a heat exchanger that indirectly heats the inlet gas stream and the stream of oxygen containing gas and water vapor to the autothermal reformer.

13. A method for improving the efficiency of a fuel cell power system, comprising the steps of:

(a) providing at least one fuel cell for generating electricity, said fuel cell comprising a cathode, an anode, and a polymer electrolyte membrane disposed therebetween, said at least one fuel cell including means to process air through the cathode to yield a cathode effluent stream;

(b) providing an inlet fuel stream consisting essentially of hydrogen and carbon containing fuels, (c) providing a stream of oxygen containing gas and water vapor;

(d) providing a fuel processor for converting the inlet fuel stream consisting essentially of hydrogen and carbon containing fuels, utilizing the stream of oxygen containing gas and water vapor, to a processed fuel stream comprising hydrogen molecules for feeding into the fuel cell anode;

(e) feeding a substantial portion of the cathode effluent stream to the fuel processor as the oxygen containing gas and water vapor for reacting with and converting the fuel stream into the processed fuel stream comprising hydrogen molecules;

(f) burning a portion of cathode effluent in a combustor; and (g) expanding any flue gas from the combustor using an expander.

14. The method for improving the efficiency of a fuel cell power system of claim 13, wherein the step of providing the inlet fuel stream includes providing an inlet stream selected from the group consisting of one or more of methanol, ethanol, natural gas, propane, gasoline, kerosene, and diesel oil.

15. The method for improving the efficiency of a fuel cell power system of claim 13, wherein the step of providing the fuel processor includes providing a partial oxidation reactor.

16. The method for improving the efficiency of a fuel cell power system of claim 13, wherein the step of providing the fuel processor includes providing an autothermal reformer.

17. The method for improving the efficiency of a fuel cell power system of claim 16, wherein the step of providing the fuel processor includes providing a water-gas shift reactor downstream of the autothermal reformer.

18. The method for improving the efficiency of a fuel cell power system of claim 13, wherein the step of providing the fuel processor includes providing a preferential carbon monoxide oxidation reactor for processing the processed fuel stream prior to feeding the processed fuel stream into the fuel cell anode.

19. A method for improving the efficiency of a fuel cell power system, comprising the steps of:

(a) providing at least one fuel cell for generating electricity, said fuel cell comprising a cathode, an anode, and a polymer electrolyte membrane disposed therebetween, said at least one fuel cell including means to process air through the cathode to yield a cathode effluent stream;

(b) providing an inlet fuel stream consisting essentially of hydrogen and carbon containing fuels;

(c) providing a stream of oxygen containing gas and water vapor;

(d) providing a fuel processor for converting the inlet fuel stream consisting essentially of hydrogen and carbon containing fuels, utilizing the stream of oxygen containing gas and water vapor, to a processed fuel stream comprising hydrogen molecules for feeding into the fuel cell anode;

(e) feeding a substantial portion of the cathode effluent stream to the fuel processor as the oxygen containing gas and water vapor for reacting with and converting the fuel stream into the processed fuel stream comprising hydrogen molecules;

(f) compressing the air upstream of the fuel cell cathode; and (g) saturating the compressed air with water vapor prior to the air entering the fuel cell cathode.

20. The method for improving the efficiency of a fuel cell power system of claim 13, including the step of heating the substantial portion of the cathode effluent stream in at least one heat exchanger downstream of the fuel cell cathode and upstream of the fuel processor.

21. The method for improving the efficiency of a fuel cell power system of claim 13, wherein step of expanding any flue gas includes an expander that is mechanically linked with an air compressor upstream of the fuel cell cathode.

22. A method for improving the efficiency of a fuel cell power system, comprising the steps of:

(a) providing at least one fuel cell for generating electricity, said fuel cell comprising a cathode, an anode, and a polymer electrolyte membrane disposed therebetween, said at least one fuel cell including means to process air through the cathode to yield a cathode effluent stream;

(b) providing an inlet fuel stream consisting essentially of hydrogen and carbon containing fuels;

(c) providing a stream of oxygen containing gas and water vapor;

(d) providing a fuel processor for converting the inlet fuel stream consisting essentially of hydrogen and carbon containing fuels, utilizing the stream of oxygen containing gas and water vapor, to a processed fuel stream comprising hydrogen molecules for feeding into the fuel cell anode;

(e) feeding a substantial portion of the cathode effluent stream to the fuel processor as the oxygen containing gas and water vapor for reacting with and converting the fuel stream into the processed fuel stream comprising hydrogen molecules;

(f) burning any anode effluent in a combustor;

(g) expanding any flue gas from the combustor using an expander; and (h) indirectly heating the inlet fuel stream to the fuel processor utilizing the expanded flue in a heat exchanger.

23. The method for improving the efficiency of a fuel cell power system of claim 18, including the step of directing a portion of the cathode effluent stream to the preferential oxidation reactor.

24. The method for improving the efficiency of a fuel cell power system of claim 13, including the step of directing a portion of the cathode-effluent to the combustor.

25. A method for improving the efficiency of a fuel cell power system, comprising the steps of:

(a) providing at least one fuel cell for generating electricity, said fuel cell comprising a cathode, an anode, and a polymer electrolyte membrane disposed therebetween, said at least one fuel cell including means to process air through the cathode to yield a cathode effluent stream;

(b) providing an inlet fuel stream consisting essentially of hydrogen and carbon containing fuels;

(c) providing a stream of oxygen containing gas and water vapor;

(d) providing an autothermal reformer for converting the inlet fuel stream consisting essentially of hydrogen and carbon containing fuels, utilizing the stream of oxygen containing gas and water vapor, to a processed fuel stream comprising hydrogen molecules for feeding into the fuel cell anode;

(e) feeding a substantial portion of the cathode effluent stream to the fuel processor as the oxygen containing gas and water vapor for reacting with and converting the fuel stream into the processed fuel stream comprising hydrogen molecules; and (f) cooling the processed fuel stream exiting the autothermal reformer by using an unprocessed fuel stream as an indirect heat transfer medium in a heat exchanger which indirectly heats the inlet gas stream and the stream of oxygen containing gas and water vapor to the autothermal reformer.

* * * * *